Feb. 6, 1923.
J. F. M. PATITZ
AIR PURIFIER.
FILED APR. 20, 1917
1,444,384.
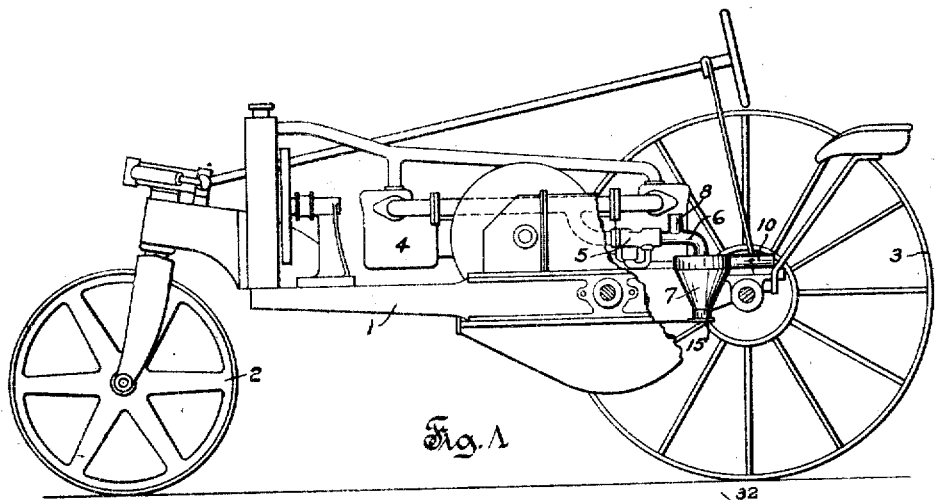
Fig. 1.
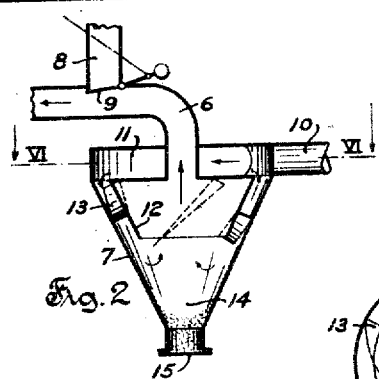
Fig. 2.
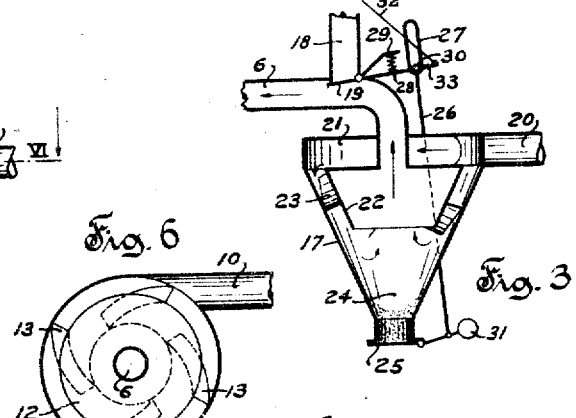
Fig. 3.
Fig. 6.
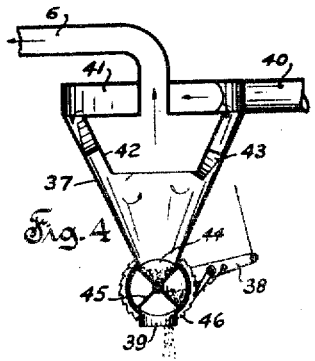
Fig. 4.
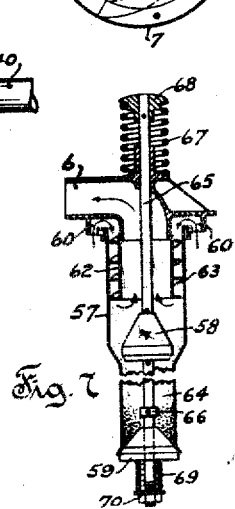
Fig. 7.
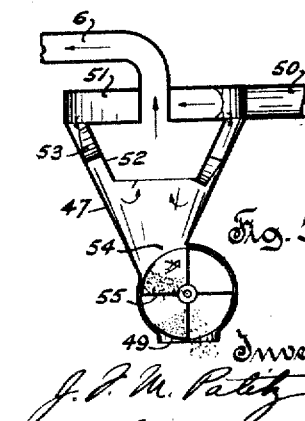
Fig. 5.
Inventor
J. F. M. Patitz
by
Attorney Patented Feb. 6, 1923.

1,444,384

UNITED STATES PATENT OFFICE.

JOHANN FRIEDRICH MAX PATITZ, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

AIR PURIFIER.

Application filed April 20, 1917. Serial No. 164,076.

*To all whom it may concern:*

Be it known that JOHANN FRIEDRICH MAX PATITZ, a citizen of the United States, residing at Milwaukee, in the county of Milwaukee and State of Wisconsin, has invented a certain new and useful Improvement in Air Purifiers, of which the following is a specification.

This invention relates to improvements in the construction of purifiers for removing impurities from air or other gases, and relates particularly to devices for purifying the air admitted to the carburetors of internal combustion traction engines.

An object of the invention is to provide an air purifier which is simple in construction and efficient in operation. Another object is to provide simple and efficient means for effecting discharge, without interrupting the flow of air through the device, of the accumulated impurities removed from air passed through a purifier. A further object is to provide an air purifier which is especially adapted for removal of impurities from the air admitted to the carburetor of an internal combustion engine driving a tractor of the type ordinarily employed in dusty localities.

A clear conception of several embodiments of the invention may be had by referring to the drawing accompanying and forming a part of this specification in which like reference characters designate the same or similar parts in the various views.

Fig. 1 is a side elevation of a farm tractor showing an air purifier applied therein.

Fig. 2 is an enlarged diagrammatic central vertical section through one form of air purifier.

Fig. 3 is an enlarged diagrammatic central vertical section through another form of air purifier.

Fig. 4 is an enlarged diagrammatic central vertical section through still another form of air purifier.

Fig. 5 is an enlarged diagrammatic central vertical section through another form of air purifier.

Fig. 6 is an enlarged diagrammatic transverse horizontal section through the air purifier disclosed in Fig. 2, the section being taken along the line VI—VI of that figure.

Fig. 7 is an enlarged fragmentary diagrammatic central vertical section through another form of air purifier.

The farm tractor to which the invention has been disclosed as applied in Fig. 1, comprises a main frame 1 with which are associated a front steering wheel 2 and a pair of rear driving wheels 3. The internal combustion engine 4 is mounted upon the main frame 1 and is drivingly connected in the usual manner, with the rear traction wheels 3. The internal combustion engine 4 is provided with a carburetor 5 of usual construction to which air is admitted through a suitable conduit 6, the flow of air being induced by the suction strokes of the engine pistons.

In the form of air purifier or dust collector disclosed in Figs. 2 and 6, the main casing 7 is of conical formation and has an upper impure-air admission chamber 11 and a lower impurity or dust collecting chamber 14. A conduit 10 communicates with the upper chamber 11, this conduit being arranged tangentially of the casing 7 in order to initially swirl the entering air. An inner casing 12 is mounted within the main casing 7, the casings 12, 7 being spaced apart to provide an annular downwardly converging passage forming means of communication between the chamber 11 and the chamber 14. A series of spiral vanes 13 are located within the annular downwardly converging passage and serve to further swirl the previously swirled air passing from the chamber 11 into the chamber 14. The interior of the central casing 12 communicates at its upper end, directly with the conduit 6 leading to the carburetor, the lower end of the casing 12 being in open communication with the chamber 14. The lower extremity of the casing 7 is provided with a removable plate 15 for effecting discharge of the accumulated impurities from the chamber 14. A conduit 8 which is normally cut off from communication with the conduit 6 by means of a valve 9, is associated with a portion of the conduit 6 beyond the air purifier. This conduit 8 may be placed in communication with the conduit 6 and communication between the conduit 6 and the interior of the casing 7 simultaneously cut off, by swinging the valve 9 through an arc of substantially 90° in a counter-clockwise direction as viewed in Fig. 1. Such operation of the valve 9 may be effected manually by the operator of the tractor.

During the normal operation of the air purifier or dust collector disclosed in Figs. 2 and 3, the impure air is admitted to the interior of the chamber 11 through the tangentially arranged conduit 10, being given an initial swirling motion. The air then passes downwardly through the annular converging passage formed between the casings 7, 12, and along the spiral vanes 13, being given a further swirling motion by the vanes 13 and having its velocity simultaneously increased due to the convergence of the passage. The relatively heavy impurities carried by the rapidly swirling air, move toward the periphery of the swirling mass due to the action of centrifugal force. These impurities pass downwardly along the wall of the casing 7 and are eventually deposited in the collecting chamber 14, while the purified air is withdrawn from the interior of the mass, upwardly through the casing 12 and conduit 6, from which it is delivered into the carburetor 5. If it is desired to remove the accumulated impurities from the chamber 14, it is first desirable to cut out the air purifier in order to avoid the flow of air through the dust removing opening and collecting chamber 14, directly into the carburetor 5. This may be accomplished by swinging the valve 9 in an anti-clockwise direction from the position disclosed in Fig. 2, in order to establish direct communication between the conduit 8 and the conduit 6 and to cut off communication between the conduit 6 and the air purifier. With the valve 9 thus positioned, the plate 15 may be removed when the accumulated impurities will drop out of the casing 7 by gravity. Upon replacing the plate 15 and releasing the valve 9, the weight secured to the extremity of the actuating lever-arm will automatically return the valve 9 to its normal position and communication between the carburetor 5 and the air purifier is automatically reestablished.

In the form of air purifier disclosed in Fig. 3 the main casing 17 is of conical formation and has an upper impure-air admission chamber 21 and a lower impurity collecting chamber 24. A conduit 20 communicates with the upper chamber 21, this conduit being arranged tangentially of the casing 17 in order to initially swirl the entering air. An inner casing 22 is mounted within the main casing 17, the casings 22, 17 being spaced apart to provide an annular downwardly converging passage forming communication between the chamber 21 and the chamber 24. A series of spiral vanes 23 are located within the annular downwardly converging passage and serve to further swirl the previously swirled air passing from the chamber 21 into the chamber 24. The interior of the central casing 12 communicates at its upper end, directly with the conduit 6 leading to the carburetor, the lower end of the casing 22 being in open communication with the chamber 24. The lower extremity of the casing 17 is provided with a dust removing valve 25 having an actuating lever-arm provided with a weight 31. A conduit 18 which is normally cut off from communication with the conduit 6 by means of a valve 19, is associated with a portion of the conduit 6 beyond the air purifier. The valve 19 has an integral projection 29 and is normally maintained in the position indicated in Fig. 3 by means of an operating rod 32 connected to the end of the arm 33. The arm 33 is loosely mounted to swing about the pivot of the valve 19, and is connected with the valve projection 29 by means of a compression spring 28. A rod 26 having a slotted upper end 27 engaging a pin 30 on the actuating arm 33, is pivotally connected at its lower end to the actuating lever-arm of the valve 25. The valve 19 is movable through the arm 33, spring 28 and projection 29, by means of the operating rod 32, which may if desired be connected for automatic actuation directly to the engine 4.

During the normal operation of the air purifier disclosed in Fig. 3, the impure air is admitted to the interior of the chamber 21 through the tangentially arranged conduit 20, being given an initial swirling motion. The air then passes downwardly through the annular converging passage formed between the casings 17, 22 and along the spiral vanes 23, being given a further swirling motion by the vanes 23 and having its velocity simultaneously increased due to the convergence of the passage. The impurities carried by the rapidly swirling air move toward the periphery of the swirling mass due to the action of centrifugal force. The relatively heavy impurities pass downwardly along the wall of the casing 17 and are deposited in the collecting chamber 24, while the purified air is withdrawn upwardly through the casing 22 and conduit 6 from which it is delivered into the carburetor 5. If it is desired to remove the accumulated impurities from the chamber 24, the valve 19 is swung in an anti-clockwise direction from the position shown in Fig. 3 by exerting a pull upon the operating rod 32. The position of the valve 25 is not affected during movement of the valve 19, as the pin 30 on the arm 33 merely moves along the slotted end 27 of the rod 26. As the valve 19 assumes its extreme position, the projection 29 becomes a stop for the end of the spring 28 and the pin 30 simultaneously engages the upper extremity of the slotted end 27. Upon moving the arm 33 beyond this position, the spring 28 is compressed between the arm 33 and projection 29 and the rod 26 is raised thus opening the valve 25 and discharging the impurities accumulated in the bottom of the chamber 24. Upon reversing the movement of the arm 33, the weight 31 automatically closes the valve 25. When the valve 25 has entirely closed, and the spring 28 has fully expanded, continued movement of the arm 33 will be transmitted through the spring 28 to the valve projection 29 and will eventually cause the valve 19 to assume its normal position.

In the form of air purifier disclosed in Fig. 4, the main casing 37 is of conical formation and has an upper impure-air admission chamber 41 and a lower impurity collecting chamber 44. A conduit 40 communicates with the upper chamber 41, this conduit being arranged tangentially of the casing 37 in order to initially swirl the entering air. An inner casing 42 is mounted within the main casing 37, the casings 42, 37 being spaced apart to provide an annular downwardly converging passage forming means of communication between the chamber 41 and the chamber 44. A series of spiral vanes 43 are located within the annular downwardly converging passage and serve to further swirl the previously swirled air passing from the chamber 41 into the chamber 44. The interior of the central casing 42 communicates at its upper end, directly with the conduit 6 leading into the carburetor 5, the lower end of the casing 42 being in open communication with the chamber 44. A bucket wheel 45 is rotatably mounted in the lower extremity of the casing 37, this bucket wheel being adapted to receive impurities from the chamber 44 and to deliver these impurities from the purifier through a discharge opening 39. The bucket wheel 45 is intermittently rotatable by means of a ratchet wheel 46 and pawl arm 38 which may be operated either manually or mechanically through a suitable connection with the engine 4.

During the normal operation of the air purifier disclosed in Fig. 4, the impure air is admitted to the interior of the chamber 41 through the tangentially arranged conduit 40, being given an initial swirling motion. The air then passes downwardly through the annular converging passage formed between the casings 37, 42, and along the spiral vanes 43, being given a further swirling motion by the vanes 43 and having its velocity simultaneously increased due to the convergence of the passage. The relatively heavy impurities carried by the rapidly swirling air, move toward the periphery of the mass due to the action of centrifugal force. These impurities pass downward along the wall of the casing 37 and are deposited into the adjacent pockets of the bucket wheel 45. If the bucket wheel 45 is adapted only for manual operation, the same should be rotated from time to time by means of the pawl arm 38 and ratchet wheel 46 in order to discharge the accumulated impurities. If the bucket wheel 45 is mechanically connected to a continuously operating driving element, the impurities will be automatically discharged from the purifier as the bucket wheel pockets are placed in communication with the discharge opening 39.

In the form of air purifier or dust collector disclosed in Fig. 5, the main casing 47 is of conical formation and has an upper impure-air admission chamber 51 and a lower impurity collecting chamber 54. A conduit 50 communicates with the upper chamber 51, this conduit being arranged tangentially of the casing 47 in order to initially swirl the entering air. An inner casing 52 is mounted within the main casing 47, the casings 52, 47 being spaced apart to provide an annular downwardly converging passage forming means of communication between the chamber 51 and the chamber 54. A series of spiral vanes 53 are located within the annular downwardly converging passage and serve to further swirl the previously swirled air passing from the chamber 51 into the chamber 54. The interior of the central casing 52 communicates at its upper end, directly with the conduit 6 leading to the carburetor 5, the lower end of the casing 52 being in open communication with the chamber 54. A bucket wheel 55 is rotatably supported at the lower end of the casing 47, this bucket wheel being rotatable by the accumulated material deposited into the pockets. The pockets of the bucket wheel are formed with peripheral walls and the bucket wheel is mounted on an axis located some distance from the center line of the casing 47, in order to permit most efficient gravity actuation of the bucket wheel. The lower extremity of the bucket wheel chamber communicates with a discharge opening 49.

During normal operation of the air purifier disclosed in Fig. 5, the impure air is admitted to the interior of the chamber 51 through tangentially arranged conduit 50, being given an initial swirling motion. The air then passes downwardly through the annular converging passage formed between the casings 47, 52, and along the spiral vanes 53, being given a further swirling motion by the vanes 53 and having its velocity simultaneously increased due to the convergence of the passage. The relatively heavy impurities carried by the rapidly swirling air, move toward the periphery of the swirling mass due to the action of centrifugal force. These impurities pass downwardly along the wall of the casing 47 and are deposited in the adjacent pockets of the bucket wheel 55. As the accumulation of impurities becomes sufficient to rotate the bucket wheel 55, the next succeeding pocket of the bucket wheel is brought into communication with the chamber 54, while the previously filled pocket pocket discharges its contents through the opening 49. It will be noted that this device is entirely automatic in its operation and does not depend upon any other operating force than gravity.

In the form of air purifier disclosed in Fig. 7, the main casing 57 is of cylindrical form and has a lower cylindrical portion of reduced diameter forming dust collecting chamber 64. The casing 57 is provided at its upper extremity with an air intake 60 and has its lower extremity normally closed by means of a valve 59. An inner casing 62 is mounted within the main casing 57, the casings 62, 57 being spaced apart to provide an annular passage forming means of communication between the air intake 60 and the dust collecting chamber 64. A series of spiral vanes 63 are located within the annular passage and serve to swirl the air admitted to the separating chamber. The interior of the central casing 62 communicates at its upper end, directly with the conduit 6 leading to the carburetor 5, the lower end of the casing 62 being in open communication with the separating chamber. The valve 59 is loosely mounted upon a rod 65 to which is affixed a valve 58 adapted to snugly fit the reduced lower portion of the casing 57. The lower extremity of the rod 65 is provided with a washer 70 secured thereto by means of a nut, between which washer and the valve 59 is located a compression spring 69. The rod 65 is also provided with a collar 66 secured thereto. The upper extremity of the rod 65 is provided with an operating member 68. A compression spring 67 engaging the operating member 68 normally serves to hold the rod 65 and valves 58, 59 in the position illustrated.

During the normal operation of the air purifier disclosed in Fig. 7, the impure air is admitted to the interior of the casing 57 through the air intake 60 and annular passage formed between the casings 62, 57. As the dust-laden air flows through this annular passage, it is given a swirling motion by the vanes 63. Due to this swirling motion, the relatively heavy impurities carried by the air move toward the periphery of the swirling mass as a result of the action of centrifugal force. The impurities pass downwardly along the wall of the casing 57 and enter the collecting chamber 64, while the purified air is withdrawn from the interior of the swirling mass, upwardly through the casing 62 and conduit 6, from which it is delivered into the carburetor 5. As the chamber 64 fills with impurities, these impurities may be removed from time to time by applying downward pressure to the operating element 68. Upon application of pressure to the element 68, the spring 67 is compressed and the rod 65 is moved downwardly carrying with it the valve 58. The valve 58 eventually cuts off communication between the chamber 64 and the upper separating chamber, after which continued downward movement of the rod 65 will cause the collar 66 to engage the valve 59 and to positively move the same from its seat, thereby discharging the contents of the chamber 64. In order to ascertain when the chamber 64 is filled with impurities, it may be desirable to provide a slight opening covered with glass or other transparent material. Upon release of the pressure from the element 68, the spring 67 will cause the rod 65 to move upwardly, carrying with it the valves 58, 59 and causing the valve 59 to engage its seat. After the valve 59 has engaged its seat, continued upward movement of the rod 65 will cause the collar 66 to move away from the valve 59 and will cause the valve 58 to assume its normal open position.

It will thus be noted that in each of the several types of air purifiers illustrated, the accumulated impurities may be discharged without interrupting the flow of air to the carburetor. By avoiding a flow of air to the carburetor through the dust accumulating chamber, the undesirable entrance of excessive quantities of dust to the carburetor is avoided. It will be noted that this device is especially applicable to internal combustion engines, driving farm tractors or other vehicles employed in dusty localities. It has been found that a very effective removal of the dust may be effected without in any way interrupting the operation of the engine.

It should be understood that it is not desired to limit the invention to the exact details of construction herein shown and described, for various modifications within the scope of the appended claims may occur to a person skilled in the art.

It is claimed and desired to secure by Letters Patent:

1. In combination, conduit means, means for producing a flow of air through said conduit means, a casing communicating with said conduit means, said casing forming a separating compartment and a dead air compartment for the reception of solid impurities, and discharge means for said dead air compartment, said discharge means comprising a valve normally urged toward closed position both mechanically and by suction induced by flow of air through said conduit means and manually movable to open position, and a second normally open valve between said compartments movable to closed position to separate said compartments when said first mentioned valve is opened.

2. In combination, conduit means, means for producing a flow of air through said conduit means, a casing communicating with said conduit means, said casing forming a separating compartment and a dead air compartment for the reception of solid impurities, and discharge means for said dead air compartment, said discharge means comprising a normally closed valve, manual means for opening said valve, and a second normally open valve for forming a partition across said dead air compartment when said first mentioned valve is opened.

3. In combination, a pipe, an engine having its inlet communicating with said pipe to produce a flow of air therethrough, a casing communicating with said pipe, said casing forming a separating compartment and a dead air compartment for the reception of solid impurities, a normally closed valve for controlling the delivery of solid impurities from said dead air compartment, said valve being normally urged toward closed position both mechanically and by suction induced by the flow of air through said pipe and being manually movable to open the same, and a second normally open valve between said compartments, said second valve being movable to closed position by the opening movement of said first mentioned valve.

4. The combination with a carburetor having an inlet pipe and adapted to be connected to an internal combustion engine so that air will be caused to pass through said pipe in response to the suction of the engine, of a casing connected with said pipe and embodying a separating compartment and a dead air compartment for the reception of solid impurities, an outlet for said dead air compartment, a normally closed, spring pressed and suction closed, and manually opened valve for said outlet, and a second normally open valve between said compartments operable to close to separate said compartments when said outlet valve is opened.

5. The combination with a carburetor having an inlet pipe and adapted to be connected to an internal combustion engine so that air will be caused to pass through said pipe in response to the suction of the engine, a casing connected with said pipe and embodying a separating compartment and a dead air compartment for the reception of solid impurities, an outlet for said dead air compartment, a normally closed valve for said outlet, manual means for opening said valve and a second normally open valve for forming, when closed, a partition across said dead air compartment.

6. The combination with a carburetor having an inlet pipe and adapted to be connected to an internal combustion engine so that air will be caused to pass through said pipe in response to the suction of the engine, a casing connected with said pipe and embodying a separating compartment and a dead air compartment for the reception of solid impurities, an outlet for said dead air compartment, a normally closed valve for said outlet, manual means for opening said valve from a remote point, and a second normally open valve for forming, when closed, a partition across said dead air compartment.

7. In a separator for use with the carburetor of an internal combustion engine the combination of a separating chamber through which air may be drawn in response to engine suction, a dead air chamber normally in communication with said separating chamber to receive the impurities therefrom, a normally closed outlet for said dead air chamber, a closure for said outlet, and means influenced by the condition of said closure for preventing the return of impurities from said dead air chamber to said separating chamber upon opening said closure.

8. In combination, conduit means, means for producing a flow of air through said conduit means, a casing communicating with said conduit means, said casing forming a separating compartment and a dead air compartment for the reception of solid impurities, discharge means for said dead air compartment, said discharge means comprising a pair of reversely operable valves, and manual means for effecting operation of said valves from a remote point.

9. In combination, conduit means, means for producing a flow of air through said conduit means, a casing communicating with said conduit means, said casing forming a separating compartment and a dead air compartment for the reception of solid impurities, a normally closed outlet for said dead air compartment, a closure for said outlet, and means influenced by the condition of said closure for preventing the return of impurities from said dead air compartment to said separating compartment upon opening said closure.

10. In combination, conduit means, means for producing a flow of air through said conduit means, a casing communicating with said conduit means, said casing forming a separating compartment and a dead air compartment for the reception of solid impurities, a normally closed outlet for said dead air compartment, a closure for said outlet, manual means for operating said closure from a remote point, and means influenced by the condition of said closure for preventing the return of impurities from said dead air compartment to said separating compartment upon opening said closure.

In testimony whereof, the signature of the inventor is affixed hereto.

JOHANN FRIEDRICH MAX PATITZ.